Inventor
Hurley D. Cook
By Marzall, Johnston, Cook & Root
Attorneys

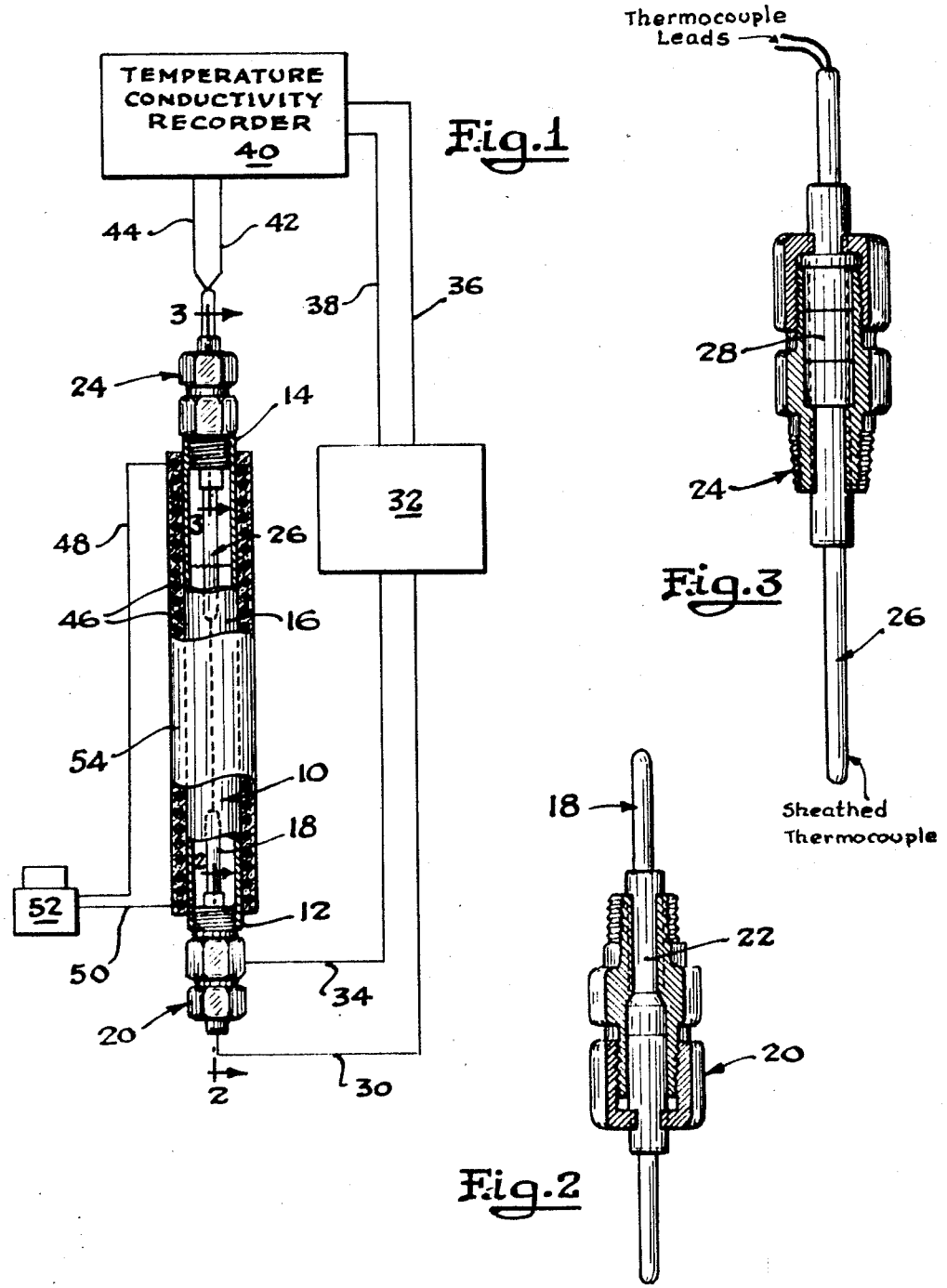

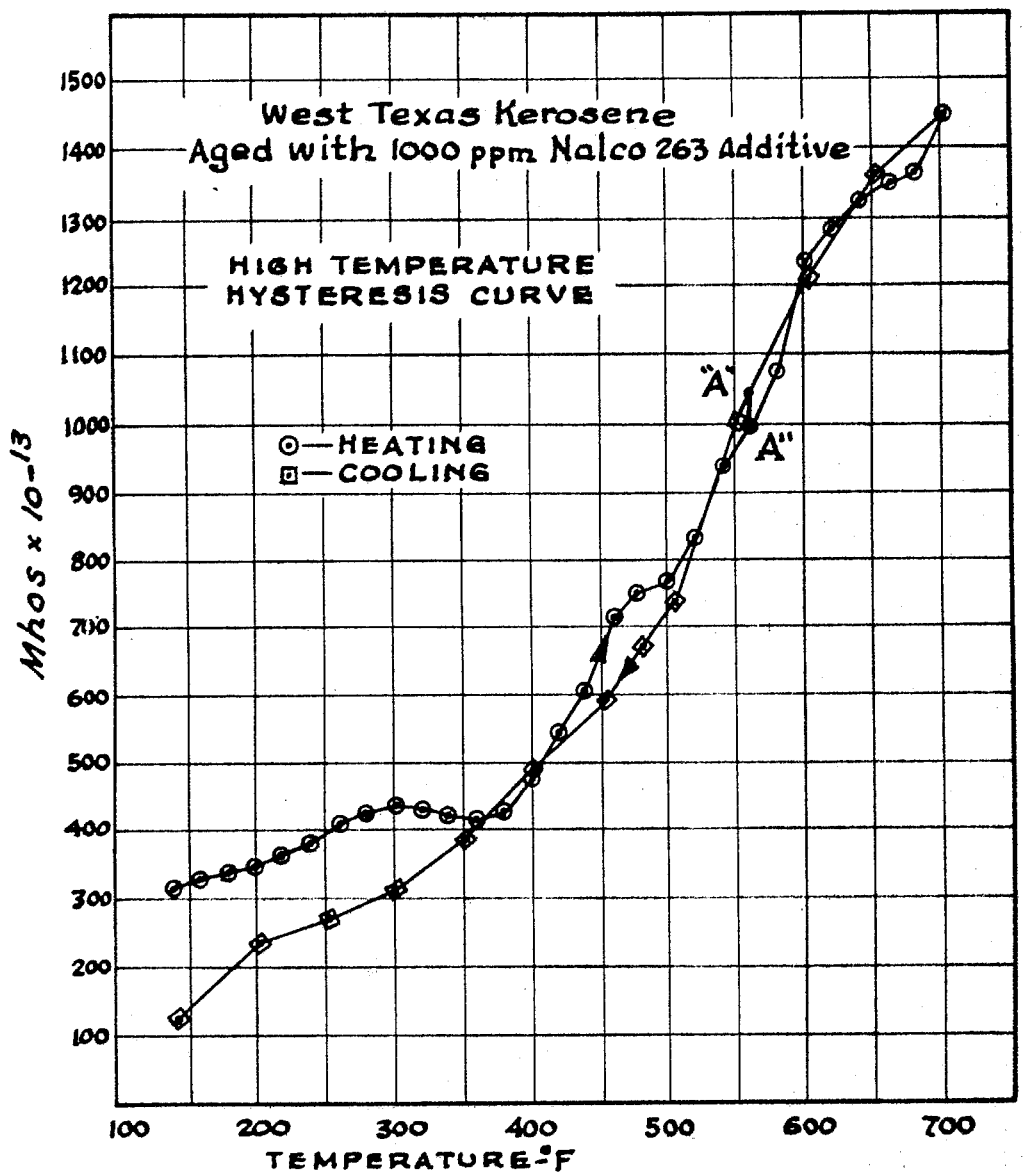

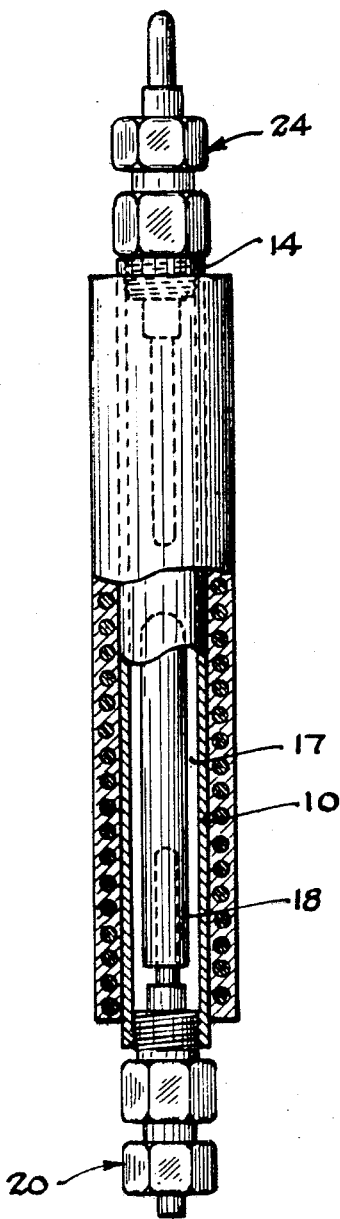

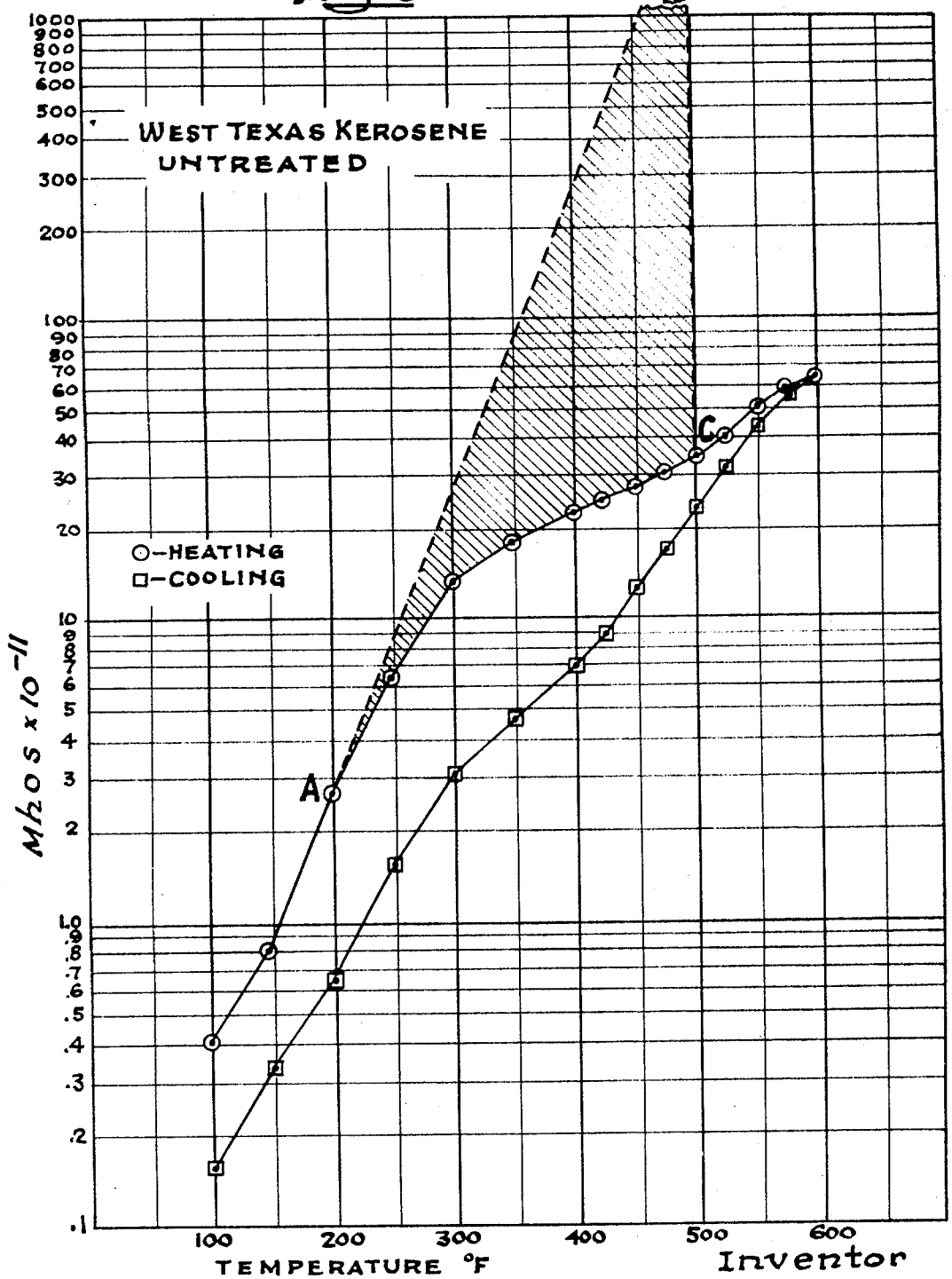

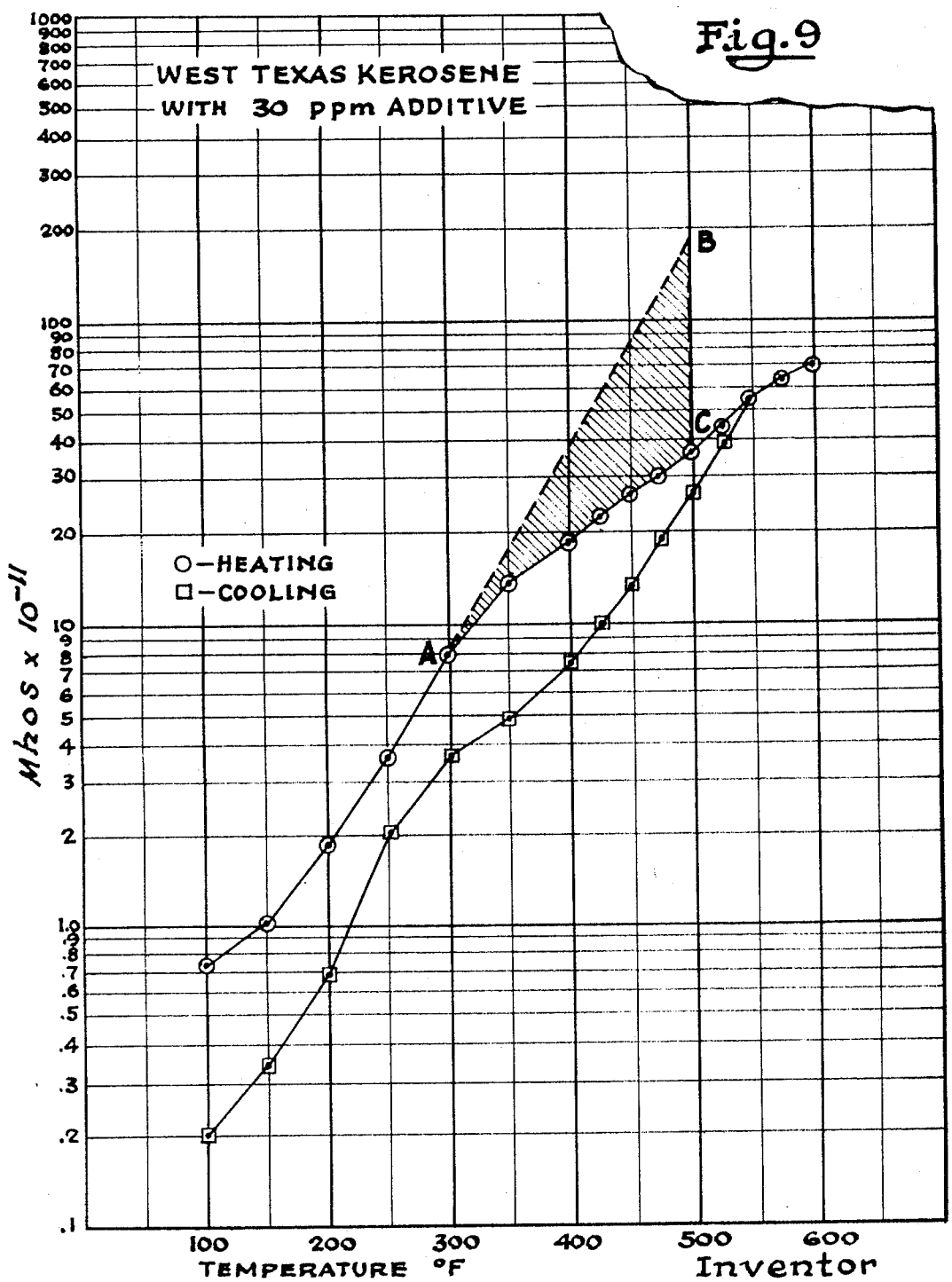

United States Patent Office 3,457,776
Patented July 29, 1969

3,457,776
APPARATUS FOR DETERMINING THE FOULING CHARACTERISTICS OF INTERMEDIATE PETROLEUM DISTILLATES
Hurley D. Cook, Highland, Ind., assignor to Nalco Chemical Company, Chicago, Ill., a corporation of Delaware
Continuation-in-part of application Ser. No. 536,250, Jan. 11, 1966. This application Nov. 4, 1966, Ser. No. 639,002
Int. Cl. G01n *11/00*
U.S. Cl. 73—61.2          7 Claims

ABSTRACT OF THE DISCLOSURE

A method for determining the fouling characteristics of petroleum hydrocarbon intermediate distillates consisting of the steps of heating a sample of the distillate and determining the electrical conductivity, cooling the distillate and determining the electrical conductivity, and comparing the two values which is an indication of the fouling tendencies of the distillate.

This application is a continuation-in-part of my copending application Ser. No. 536,250, filed Jan. 11, 1966, and now abandoned.

As the title indicates, this invention is directed to an apparatus for determining the fouling characteristics of intermediate petroleum distillates. Specifically, the apparatus of the invention is directed to not only determining the fouling characteristics of these distillates, but also it allows a number of chemical additives for preventing fouling to be rapidly screened for their effectiveness.

With the ever-increasing need for higher octane gasolines, improved aviation fuels and improved residual fuels, it has become the practice to treat the various refinery charge stocks to extract improved fuel values therefrom. These various processes, while greatly improving the fuel yield of a given charge stock, have tended to increase refining problems which, in the past, were not critical.

One of the worst problems encountered in the treatment of various petroleum charge stocks is the phenomenon which is now recognized and is descriptively called fouling. This phenomenon manifests itself in the form of deposits which frequently form on the metal surfaces of the processing equipment and tend to materially decrease the efficiency of the intermediate refining operations. The direct results of fouling appear in the forms of heat transfer loss, increased pressure drops, loss in throughput and, in some instances, a specific type of corrosion product which is associated with the deposits.

The charge stocks which most commonly cause fouling in the intermediate refinery equipment are naphthas, gas oils, and crudes. The naphthas or light distillate stocks may be considered as a light oil, at least 10% of which boils below 347° F. and at least 95% of which distills below 464° F. The gas oils which frequently are referred to as middle distillates usually are intermediates between the so-called kerosene fractions and the light lubricating cuts. These gas oils are usually used as charges to cracking units where the molecules are broken down into smaller components. The crude oils which most commonly cause the problem of fouling are virgin products charged to the first refining stage operations and contain all of the petroleum fractions normally removed in the refining processes. For the purposes of this invention, crude stocks are intended to cover the so-called residual or pot fractions which remain after the volatile components and solvent extractable components of the crudes have been removed.

The various charge stocks mentioned above are most frequently subjected to one or more of the following general type processes to produce fuels: reforming, cracking, alkylation, isomerization, polymerization, desulfurization, hydrogenation, and dehydrogenation. These processes may be performed using a number of specific refining techniques which frequently employ catalytic reagents. A description of these various processes and their modifications are described in the publication, Petroleum Refiner, September 1958.

The deposits previously mentioned most frequently occur at elevated temperatures which range between 200° F. and 1100° F. The types of mechanical equipment most commonly affected are furnaces, heat exchanges, reboilers, and condensers. In these types of equipment, the charge stock is usually caused to flow through various types of heat processing equipment such as pipes, heat exchangers, furnaces, etc., which, for purposes of simplification, are referred to herein as conductors.

The deposits forming on the metal surfaces thus described are varied in composition and may be either organic, inorganic, or mixed organic and inorganic, with the latter type deposit being the most common type found in intermediate refining processes. The organic deposits are primarily polymerization products and are usually black, gummy masses which may be converted to coke-like masses at elevated temperatures. The inorganic portions of the deposits will frequently contain such components as silica, iron oxide, sulfur trioxide, iron sulfide, calcium oxide, magnesium oxide, inorganic chloride salts, sodium oxide, alumina, sodium sulfate, copper oxides and copper salts. The source of the inorganic components of the deposits is difficult to locate in any one given refining operation, but frequently they may be ascribed as coming from such sources as ash components of the crude oils, corrosion products from the metal surfaces the charge stocks contact, and contaminants resulting from the contact with the various metallic catalytic reagents used to process the stock.

Several devices have been used to determine the fouling characteristics of various refinery feed stocks: In several respects these devices are subject to limitations which renders them not entirely satisfactory from a practical use standpoint. One of the most important devices and techniques available for determining the fouling tendencies of hydrocarbon feedstocks is described in copending application U.S. Ser. No. 271,962, filed Apr. 10, 1963, by Mahmoud Dajani. The principle of this apparatus and method is based on the streaming potential or zeta potential of a hydrocarbon fluid. While this technique has many advantages not heretofore available to the art, it is limited in its usefulness in that complex mathematical equations must be applied to evaluate the data obtained.

The apparatus of this invention is much simpler in construction and may be operated by nonskilled technicians since only simple manipulative techniques are required. Furthermore, the apparatus can be made portable, requires a minimum of parts to construct, and allows the results to be directly interpreted. Another advantage of the invention is that the apparatus may be operated to closely simulate actual refinery conditions to which a given feedstock is subjected. It is particularly useful for rapidly screening a number of antifouling additives to determine optimum concentrations and the best additive for a particular charge stock under specific refinery operating conditions.

It therefore becomes an object of the invention to provide an apparatus for rapidly determining the fouling characteristics of intermediate petroleum distillates.

Another object of the invention is to furnish an apparatus which is capable of being operated by untrained personnel in refineries or laboratories.

A further object of the invention is to provide a small, compact apparatus useful in evaluating antifouling additives for intermediate petroleum distillates.

An important object of the invention, which will be more fully described hereinafter, is the provision of a method for determining the fouling characteristics of intermediate petroleum distillates utilizing the electrical conductivity of these fluids.

Other objects will appear hereinafter.

The invention may be more fully understood by referring to the drawings of which:

FIG. 1 is a schematic view, broken away in part, of the apparatus of the invention.

FIG. 2 is a vertical view of the electrode and electrode holder broken away in part, taken across line 2—2 of FIG. 1.

FIG. 3 is a vertical view of a temperature sensing device and holder therefor that have been broken away in part, taken across lines 3—3 of FIG. 1.

FIGS. 4–6 are graphs ilustrating the fouling characteristics of a kerosene feedstock using data obtained from the apparatus.

FIG. 7 is an enlarged schematic view, broken away in part, of a preferred apparatus of the invention.

FIGS. 8 and 9 are graphs illustrating a preferred mode of illustrating the fouling characteristics of a kerosene feedstock using data obtained from the apparatus.

Figure 4:
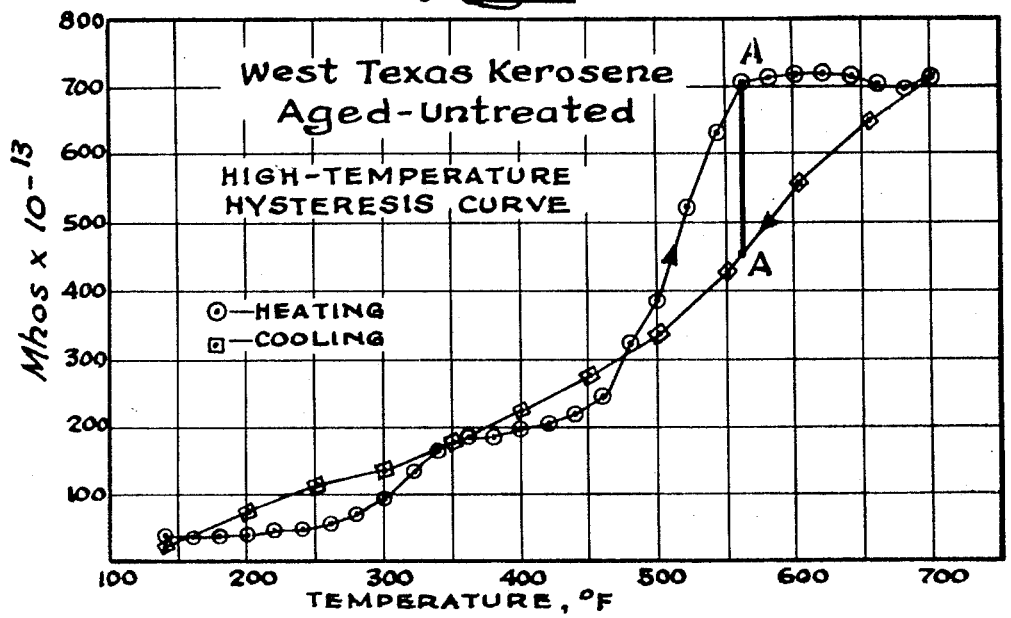

With specific reference to FIG. 1, there is shown a vertically mounted sample container 10 having a bottom 12 and a top 14 defining an annular space 16 within container 10. The container is composed of a corrosion- and heat-resistant material such as stainless steel. It is essential that the container, or at least the portion thereof that contacts the hydrocarbon, be electrically conductive. Positioned within the container is an electrode 18 which is held in place by pressure sealing gland 20 which seals the electrode into the container and at the same time electrically insulates it therefrom.

The pressure sealing gland and electrode assembly are shown to the best advantage in FIG. 2. Contained within the pressure sealing gland 20 is an insulating spacer 22 which prevents contact of electrode 18 with the container 10. An important concept of the invention resides in the selection of a material of construction for the insulator 22. It is a special requirement of the invention that the resistivity of the insulator be of at least one order of magnitude greater than the resistivity of the liquid to be tested. For example, if the resistivity of the liquid is equal to $10^n$ ohms, then the resistivity of the insulator must be at least $10^{n+1}$ ohms. In the usual case of petroleum hydrocarbon intermediate distillates, a Teflon fitting is very satisfactory with its resistivity of $10^{14}$ ohms. The limiting requirement is that the resistivity of the insulator must always be sufficiently greater than the resistivity of the liquid to be tested so that the current leakage from the electrode through the resistor to the electrically conductive pressure vessel will not mask the measurement of the conductivity of the liquid. Positioned at the top of the sample container is another pressure sealing gland 24 which is similar in design to pressure sealing gland 20. As shown in FIG. 3, this gland contains a sheathed thermocouple 26 which is insulated from the gland by insulator 28. This insulator may be constructed of high temperature-resistant ceramics such as lava.

The electrode 18 is connected though line 30 to one terminal of a sensitive ammeter 32. The other line 34 of the circuit is connected to the side of the sealing gland 20. The ammeter 32 is connected to an appropriate power source, not shown.

In a preferred embodiment of the invention, the ammeter is also connected through lines 36 and 38 to a combination conductivity-temperature recorder 40. This recorder is connected to thermocouple 26 through lines 42 and 44.

In another preferred embodiment of the invention, shown in FIG. 7, the size of the electrode 18 is increased so as to narrow the space 17 between the electrode 18 and the sample container 10. This narrowing of the space shortens the path of the electrical current, used to measure the conductivity of the distillate, thereby increasing the conductivity as registered by the ammeter 32. This increased conductivity reading is desirable when certain types of recording instruments are used, which generate stray currents. It has been found, for instance, that the current to be measured must be of at least one order of magnitude higher than any stray current present for any accurate conductivity measurement to be made on the distillate. In other words, if a stray current of $10^{-10}$ to $10^{-11}$ amperes is present then the distance between the electrode and the pressure vessel should be such that the resistance through the distillate between them is $10^9$ to $10^{10}$ ohms to give a current to be measured of $10^{-9}$ to $10^{-10}$ amperes. Most preferably the resistance would be $10^9$ to $10^{10}$ ohms in the case as given or such that the current measured will be $10^{n+1}$ to $10^{n+2}$ amperes where $10^n$ amperes is the value of the stray current present.

Referring again to FIG. 1, the sample container 10 is further provided with heating means which are composed of electrical resistance coils 46 which are connected through lines 48 and 50 to a variable transformer 52 which is connected to a power source not shown. The electrical heating coils are enclosed in a suitable ceramic insulating cement 54 which allows the heat to be directed to the sample container rather than into the atmosphere.

In operation of the apparatus, the pressure sealing gland 24 is removed from the container and sufficient charge stock to be evaluated is added to the sample container 10 to completely cover electrode 18. Experimentation has shown that electrode 18 should be from about ⅓ to ½ the length of sample container 10.

After the liquid has been inserted, the pressure sealing gland is tightened and the electrical instruments previously described are set in operation. The temperature of the sample is rapidly raised from about ambient temperature to about midway between 250° and 1000° F. over a period not exceeding more than 10 minutes. As the temperature is being raised, the temperature-conductivity recorder continuously notes the conductivity information supplied by the ammeter 32 and the interior temperature of the container which is sensed by thermocouple 26.

After the desired temperature has been reached, the transformer 52 is turned off and the sample is allowed to cool. The temperature and conductivity recorders are left on and the temperature and conductivity are recorded throughout the cooling period.

Figure 5:
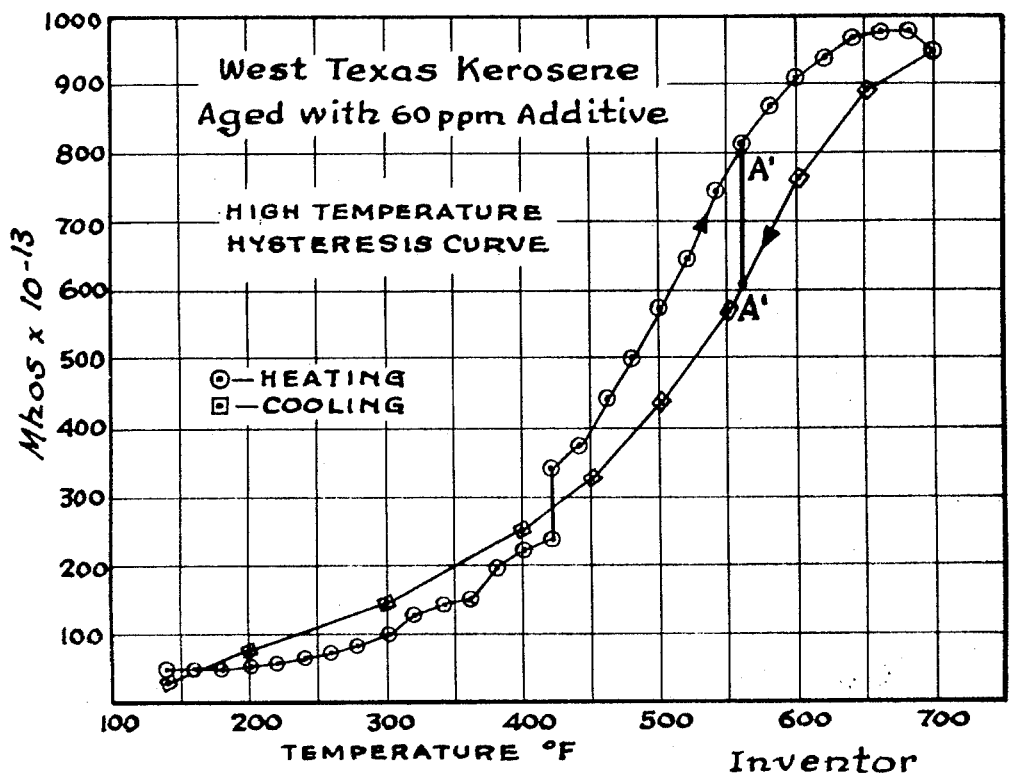

For convenience in analyzing the results from the temperature-conductivity recorder, it is desirable to plot the data from the temperature-conductivity recorder as has been done in FIGS. 4–6.

It has been discovered that, in addition to determining the fouling tendencies of petroleum hydrocarbon intermediate distillates, through use of the above-described apparatus, this apparatus is also useful in determining the efficiency and optimum dosage of antifouling additives used to treat the petroleum hydrocarbon intermediate distillates. In such cases, it is only necessary to add various predetermined incremental dosages of the proposed additives to samples of the intermediate distillates or products to be treated. Each treated sample can be tested in the same way that the untreated sample is tested. By comparison of the conductivity during heating and cooling in each treated sample with the conductivity under the same conditions in each untreated sample, the effectiveness of the additive dosages can be easily determined. This technique offers a convenient and rapid method of determining whether or not a proposed additive is carrying out its role in reducing the fouling tendencies of petroleum fluids. For example, if treated samples show an increase in the difference between the conductivities during heating and cooling, it becomes obvious that the wrong treatment is being used. On the other hand, if, as is usually expected, the difference between the conducbe seen that the proper additive is being used and it only remains to determine the proper dosage.

In a preferred embodiment of the subject invention the apparatus is operated in the manner described above except that the conductivity of the distillate is only measured during the heating period and not during the cooling period.

For convenience in analyzing the results obtained on the temperature-conductivity recorder in this preferred embodiment, it is desirable to plot the data from the recorder as has been shown in FIGS. 8 and 9. It will be noted that the curves of FIGS. 8 and 9 have been obtained by plotting the conductivity as a logarithmic function of temperature.

The dotted line A—B on both FIGS. 8 and 9 is described by the base point A, which is that point at which the slope of the conductivity-temperature curve first starts to decrease, and a slope which is the same as the maximum slope achieved by the curve up to the point at which the slope of that curve first starts to decrease in value. The dotted line B—C on both FIGS. 8 and 9 is that line which intersects both the straight line A—B and the conductivity-temperature curve at the temperature to which the tendency of a distillate to produce fouling is being determined.

It has been discovered that, in addition to determining A—B in FIGS. 8 and 9, is drawn from the point at which the slope of the conductivity-temperature curve first decreases as the curve may have a later increase in slope followed by a later decrease in slope which should not be considered in determining said straight line.

In this preferred embodiment of the subject invention, the area determined by line A—B, line B—C and the conductivity-temperature curve is taken as being directly proportional to the fouling tendencies of a given petroleum hydrocarbon intermediate distillate.

It can be seen by inspection of FIGS. 8 and 9 that this preferred embodiment also provides an effective use of the apparatus of the subject invention and a method for determining the effectiveness of various antifouling additives used to treat petroleum hydrocarbon intermediate distillates. It is only necessary to test succeeding treated samples in the same manner as an original untreated sample of a given distillate. The results of each test can be plotted according to the above-described embodiment of the invention and the areas between the straight lines and the curve compared. The effectiveness of a particular antifouling additive and dosage can be determined by comparing the areas determined on the graphs and thus the fouling tendencies after each treatment.

The above-described technique is suited for testing any petroleum hydrocarbon intermediate distillates such as naphthas, gas oils, etc. Final petroleum products, such as fuel oils, gasolines, mineral oils, catalytically cracked gasolines, etc. may also be tested for stability. When proposed additives are to be tested for effectiveness in the above, there is no limitation as to the type, physical form, or chemical structure of the particular additive to be tested. The only requirement which varies in testing any of the above-mentioned products is that the apparatus may have to be modified within its general conception so as to be able to duplicate pressures and temperatures in rates of increase or decrease of said pressures and temperatures encountered in a service application for which the product is to be tested.

The following examples best illustrate the process outlined above.

EXAMPLE I

A 30 milliliter sample of untreated West Texas kerosene was placed in a pressure vessel of the apparatus shown in FIG. 1. The sample was heated to 700° F. in 7.5 minutes and allowed to cool as soon as 700° F. was reached. The conductivity of the kerosene was measured continuously during the heating and cooling period and was plotted automatically on a two-point recorder with the conductivity as a function of the temperature. A duplicate of this plot is shown in FIG. 4. Line A—A on FIG. 4, at 560° F., describes the difference in conductivity between the heating and cooling curves at this temperature. This difference in conductivity is proportional to the fouling tendency of the kerosene at this temperature.

EXAMPLE II

Another sample of the same West Texas kerosene was treated with 60 p.p.m. of a typical antifouling additive similar to the type described in U.S. Patent 3,105,810, Table I, Composition VII. This sample was placed in a pressure vessel and heated and cooled according to the same schedule as used in Example I. The conductivity during the heating and cooling of the sample is shown as a function of temperature in FIG. 5. The line A⁻—A⁻ on FIG. 5, at 560° F., describes the difference in conductivity between the heating and cooling curves at this temperature. This difference in conductivity is proportional to the fouling tendency of the kerosene at this temperature.

EXAMPLE III

A third sample of West Texas kerosene was treated with 1000 p.p.m. of the same typical antifouling additive which was used in Example II. This third sample was placed in a pressure vessel and heated and allowed to cool according to the same schedule as used in Examples I and II. The conductivity was again measured during heating and cooling. This conductivity is plotted as a function of temperature in FIG. 6. Line A=—A= on FIG. 6, at 560° F., describes the difference in conductivity between the heating and cooling curves at this temperature. This difference in conductivity is again proportional to the fouling tendency of the distillate at this temperature.

EXAMPLE IV

A sample of untreated West Texas kerosene was placed in a pressure vessel of the apparatus shown in FIG. 7. The sample was heated to 700° F. in 7.5 minutes. The conductivity of the kerosene was measured continuously during the heating period and was plotted automatically on a two-point recorder as a function of temperature. A duplicate of this plot is shown in FIG. 8. A—B on FIG. 8 was constructed using point A, the point at which the slope of the heating curve first commenced to decrease, as the base of the line and the slope of the curve at point A, which was the maximum slope attained by the curve before the slope commenced to decrease, as the slope of line A—B. Line B—C was next constructed as a vertical line corresponding to the temperature of 500° F. to intersect the straight line, A—B and the conductivity curve. The shaded area shown on FIG. 8, determined by lines A—B, B—C and the heating curve, was then measured and found to be a function of the fouling tendencies of the kerosene during heating to 500° F.

EXAMPLE V

Another sample of the same West Texas kerosene which was used in Example IV was treated with 30 p.p.m. of a typical anti-fouling additive, similar to the type described in U.S. Patent 3,105,810, Table I, Composition VII. This sample was placed in a pressure vessel and heated according to the same schedule as used in Example IV. The conductivity during the heating of the sample is shown as a function of temperature in FIG. 9. The line A—B on FIG. 9 was constructed using point A as the base and the slope of the heating curve at point A as its slope in the same manner of construction as line A—B on FIG. 8. The line B—C on FIG. 9 was constructed in the same manner as line B—C on FIG. 8 corresponding to 500° F. The area bounded by lines A—B, B—C and the heating curve was again determined. This area on FIG. 9 was compared with the corresponding area from FIG. 8. The decrease in the shaded area from FIG. 8 to FIG. 9 was found to be proportional to the decrease in the fouling tendencies of the West Texas kerosene resulting from the treatment with 30 p.p.m. of the antifouling additive.

It can be seen by a comparison of the treatments of the samples in the foregoing examples and a comparison of the difference in conductivity between the heating curves and cooling curves in FIGS. 4, 5 and 6 and the shaded areas in FIGS. 8 and 9 corresponding to these samples, that the difference in conductivity in the first method and the shaded area in the second preferred method decreased as the amount of antifouling additive used increased. Actual fouling caused by samples of the West Texas kerosene corresponding to that of the examples was measured after subjecting control samples to the same heating and cooling cycles as the samples on which the conductivity data was run. The fouling was found to be the greatest in samples with no treatment with decreases in fouling tendencies as predicted by the conductivity data of the examples shown. These control tests demonstrate the effectiveness of this method of predicting fouling tendencies of petroleum hydrocarbon intermediate distillates.

The invention is hereby claimed as follows:

1. An apparatus for determining the fouling tendencies of petroleum hydrocarbon intermediate distillates which comprises an electrically conductive pressure vessel adapted to contain a small sample of the petroleum hydrocarbon intermediate distillate to be tested, means for heating the sample, means for sensing the temperature of the sample within the vessel, an electrode positioned within the vessel and electrically insulated therefrom by an insulator having a resistivity of at least $10^{n+1}$ ohms (where the resistivity of the sample is $10^n$ ohms), and adapted to contact the sample, electrical sensing means connected to the electrode in the sample container for determining the conductivity of the sample and means for recording the conductivity and temperature of the sample.

2. An apparatus for determining the fouling tendencies of petroleum hydrocarbon intermediate distillates which comprises a vertically mounted electrically conductive cylindrical pressure vessel adapted to contain a sample of petroleum hydrocarbon intermediate distillate, said cylinder being composed of material which is chemically inert to the distillate and having its ends as a top and a bottom with its vertical height greater than its cross-sectional diameter, an electrical heating element mounted externally to the vessel, a thermocouple mounted inside of a protection tube of a material which is chemically inert to the distillate with said tube penetrating the top of the cylinder through a pressure seal so as to contact the distillate, an electrode of a material which is chemically inert to the distillate penetrating the bottom of the cylinder through an electrically insulating pressure seal, said electrically insulating pressure seal of a material which is chemically inert to the distillate and which has a resistivity of $10^{14}$ ohms, means connected to the electrode and the sample container for determining the conductivity of the distillate and means for recording the conductivity and temperature of the distillate.

3. A method of determining the fouling tendencies of petroleum hydrocarbon intermediate distillates which comprises the steps of heating a petroleum hydrocarbon intermediate distillate of the type normally processed in refinery heat exchange equipment, determining the electrical conductivity of said distillate during heating, recording said conductivity as a curve on a graph with conductivity as a logarithmic function of temperature as its slope, describing a straight line on said graph having the first maximum in the slope of said curve as the slope of said straight line and the point from which the slope of said curve first decreases as the base of said straight line and determining the area described by said curve, said straight line and a vertical line connecting said curve and said straight line as an indication of the fouling tendencies of the distillate.

4. The method of claim 3 where the heating period of the petroleum hydrocarbon intermediate distillate and the temperature to which it is elevated corresponds to the residence time and temperature of this type of distillate in refinery heat exchange equipment in which the distillate is being processed.

5. The method of claim 3 where at least one additional sample of the same petroleum hydrocarbon intermediate distillate which contains a measured amount of an antifouling additive is subjected to the identical steps of claim 5 and where the electrical conductivity of the additional sample when considered in relation to the electrical conductivity of the petroleum hydrocarbon intermediate distillate alone determines the effectiveness of the antifouling additive.

6. The method of claim 3 where the temperature and electrical conductivity of the sample of the petroleum hydrocarbon intermediate distillate are recorded continuously and simultaneously.

7. A method of determining the fouling tendencies of petroleum hydrocarbon intermediate distillates which comprises the steps of heating a petroleum hydrocarbon intermediate distillate, determining the electrical conductivity of the ditsillate during heating, allowing the distillate to cool, determining the electrical conductivity of the distillate during cooling, comparing the conductivity of the distillate during heating with the conductivity of the distillate during cooling and determining the differences between said conductivities as indications of the founling tendencies of the distillate.

References Cited

UNITED STATES PATENTS

| | | | |
|---|---|---|---|
| 2,913,893 | 11/1959 | Mathews et al. | 73—61.1 |
| 3,148,534 | 9/1964 | Benson | 73—61.2 |
| 3,250,117 | 5/1966 | Dajani | 73—61.2 |

LOUIS R. PRINCE, Primary Examiner

JOSEPH W. ROSKOS, Assistant Examiner

UNITED STATES PATENT OFFICE
CERTIFICATE OF CORRECTION

Patent No. 3,457,776                                      July 29, 1969

Hurley D. Cook

It is certified that error appears in the above identified patent and that said Letters Patent are hereby corrected as shown below:

Column 5, line 26, "It has been discovered that, in additio to determining" should read -- It is essential to the invention that the straight line --. Column 8, line 29, claim reference numeral "5" should read -- 3 --; line 42, "ditsillate" should read -- distillate --.

Signed and sealed this 21st day of April 1970.

(SEAL)
Attest:

Edward M. Fletcher, Jr.
Attesting Officer

WILLIAM E. SCHUYLER, JR.
Commissioner of Patents